US008180803B2

(12) United States Patent
Goyal

(10) Patent No.: US 8,180,803 B2
(45) Date of Patent: May 15, 2012

(54) DETERMINISTIC FINITE AUTOMATA (DFA) GRAPH COMPRESSION

(75) Inventor: Rajan Goyal, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 784 days.

(21) Appl. No.: 11/986,970

(22) Filed: Nov. 27, 2007

(65) Prior Publication Data
US 2009/0138494 A1 May 28, 2009

(51) Int. Cl.
G06F 7/00 (2006.01)
(52) U.S. Cl. ........ 707/798; 709/224; 709/227; 709/228; 709/231
(58) Field of Classification Search ........... 707/798; 709/224, 227, 228, 231
See application file for complete search history.

(56) References Cited

U.S. PATENT DOCUMENTS

| 5,230,061 | A | | 7/1993 | Welch |
| 5,327,544 | A | * | 7/1994 | Lee et al. ............... 716/104 |
| 6,047,283 | A | * | 4/2000 | Braun .................... 1/1 |
| 6,076,087 | A | | 6/2000 | Suciu |
| 6,192,282 | B1 | | 2/2001 | Smith et al. |
| 6,493,698 | B1 | | 12/2002 | Beylin |
| 6,925,641 | B1 | | 8/2005 | Elabd |
| 6,952,694 | B2 | | 10/2005 | Mathur et al. |
| 7,028,141 | B2 | | 4/2006 | Ohba |
| 7,046,848 | B1 | | 5/2006 | Olcott |
| 7,085,918 | B2 | | 8/2006 | Sharangpani et al. |
| 7,093,023 | B2 | | 8/2006 | Lockwood et al. |
| 7,185,081 | B1 | | 2/2007 | Liao |
| 7,188,168 | B1 | | 3/2007 | Liao |
| 7,225,188 | B1 | * | 5/2007 | Gai et al. ............... 1/1 |
| 7,301,541 | B2 | | 11/2007 | Hansen et al. |
| 7,305,372 | B2 | | 12/2007 | Bridges et al. |
| 7,454,588 | B2 | | 11/2008 | Greicar |
| 7,689,530 | B1 | * | 3/2010 | Williams et al. .......... 706/62 |
| 2002/0099909 | A1 | | 7/2002 | Meyer |

(Continued)

FOREIGN PATENT DOCUMENTS

EP 1 607 823 A2 12/2005

(Continued)

OTHER PUBLICATIONS

Anonymous, Graph (data structure) [online] Oct. 2007 [retrieved on Oct. 3, 2007] Retrieved from the Internet URL: http://en.wikipedia.org/w/index.php?title=graph_(data structure) &o. . . .

(Continued)

Primary Examiner — Cheyne Ly
(74) Attorney, Agent, or Firm — Hamilton, Brook, Smith & Reynolds, P.C.

(57) ABSTRACT

An apparatus, and corresponding method, for generating a graph used in performing a search for a match of at least one expression in an input stream is presented. The graph includes a number of interconnected nodes connected solely by valid arcs. A valid arc of a current node represents a character match in an expression of a character associated with the current node. Arcs which are not valid may be pruned. Non-valid arcs may include arcs which point back to a designated node(s), or arcs that point to the same next node as the designated node(s) for the same character. Typically, the majority of arcs associated with a node are non-valid. Therefore, pruning the non-valid arcs may greatly reduce graph storage requirements.

17 Claims, 14 Drawing Sheets

U.S. PATENT DOCUMENTS

| | | | |
|---|---|---|---|
| 2003/0051043 A1 | 3/2003 | Wyschogrod et al. | |
| 2003/0065800 A1 | 4/2003 | Wyschogrod et al. | |
| 2003/0110208 A1 | 6/2003 | Wyschogrod et al. | |
| 2003/0195874 A1 | 10/2003 | Akaboshi | |
| 2004/0049596 A1 | 3/2004 | Schuehler et al. | |
| 2004/0059443 A1 | 3/2004 | Sharangpani | |
| 2004/0071152 A1 | 4/2004 | Wolrich et al. | |
| 2004/0083387 A1 | 4/2004 | Dapp et al. | |
| 2004/0098384 A1 | 5/2004 | Min et al. | |
| 2004/0162826 A1 | 8/2004 | Wyschogrod et al. | |
| 2004/0172234 A1* | 9/2004 | Dapp et al. | 704/1 |
| 2004/0176945 A1 | 9/2004 | Inagaki et al. | |
| 2004/0179477 A1 | 9/2004 | Lincoln et al. | |
| 2004/0215593 A1 | 10/2004 | Sharangpani et al. | |
| 2004/0225999 A1* | 11/2004 | Nuss | 717/114 |
| 2004/0250045 A1 | 12/2004 | Dowling | |
| 2004/0267779 A1* | 12/2004 | Carter et al. | 707/100 |
| 2005/0012521 A1 | 1/2005 | Sharangpani et al. | |
| 2005/0097514 A1* | 5/2005 | Nuss | 717/114 |
| 2005/0108518 A1 | 5/2005 | Pandya | |
| 2005/0138276 A1 | 6/2005 | Navada et al. | |
| 2005/0238010 A1 | 10/2005 | Panigrahy et al. | |
| 2005/0238022 A1 | 10/2005 | Panigragy et al. | |
| 2005/0240999 A1 | 10/2005 | Rubin et al. | |
| 2005/0251509 A1 | 11/2005 | Pontius | |
| 2005/0273450 A1* | 12/2005 | McMillen et al. | 707/1 |
| 2006/0059165 A1 | 3/2006 | Bosley et al. | |
| 2006/0069872 A1 | 3/2006 | Bouchard et al. | |
| 2006/0075206 A1 | 4/2006 | Bouchard et al. | |
| 2006/0085533 A1 | 4/2006 | Hussain et al. | |
| 2006/0242123 A1* | 10/2006 | Williams, Jr. | 707/3 |
| 2007/0038798 A1 | 2/2007 | Bouchard et al. | |
| 2007/0133593 A1 | 6/2007 | Shankara | |
| 2007/0276788 A1 | 11/2007 | Cohen | |
| 2008/0046423 A1* | 2/2008 | Khan Alicherry et al. | 707/6 |
| 2008/0263665 A1 | 10/2008 | Ma et al. | |
| 2009/0037379 A1 | 2/2009 | Bou-Diab et al. | |
| 2009/0119399 A1 | 5/2009 | Hussain et al. | |
| 2009/0138440 A1 | 5/2009 | Goyal et al. | |
| 2010/0114973 A1 | 5/2010 | Goyal | |

FOREIGN PATENT DOCUMENTS

| | | |
|---|---|---|
| WO | WO 2004/013777 A1 | 2/2004 |
| WO | WO 2006/031659 A1 | 3/2006 |
| WO | WO 2009/070191 | 6/2009 |
| WO | WO 2009/070192 A1 | 6/2009 |

OTHER PUBLICATIONS

Daciuk, J. "Experiments with Automata Compression," Database Inspec [online] The Institution of Electrical Engineers, GB (2000) and Proceedings of Fifth International Conference on Implementation and Application of Automata: 113-119 (Jul. 24-25, 2000).

International Search Report from PCT/US2008/011543 mailed on Mar. 2, 2009.

International Search Report from PCT/US2008/011545 mailed on Mar. 2, 2009.

International Preliminary Report on Patentability for Int'l Application No. PCT/US2008/011543; Date Mailed: Jun. 10, 2010.

Written Opinion for PCT/US2008/011545 mailed Mar. 2, 2009.

International Preliminary Report on Patentability and Written Opinion, PCT/US2008/011545, mailed Jun. 1, 2010.

Int'l Search Report for PCT/US2005/032236, mailed May 16, 2006.

Written Opinion for PCT/US2005/032236, mailed May 16, 2006.

International Preliminary Report on Patentability for PCT/US2005/032236, mailed Mar. 13, 2007.

European Examination Report for European Application No. 05812863.8, mailed May 14, 2008.

Melvin, S., et al., "A Massively Multithreaded Packet Processor," Paper presented at NP2: Workshop on Network Processors, held in conjunction with The 9th International Symposium on High-Performance Computer Architecture, Anaheim, CA (Feb. 2003).

Schuehler, David V., et al., "Architecture for A Hardware-Based, TCP/IP Content-Processing System," IEEE Computer Society, pp. 62-69 (Jan.-Feb. 2004).

Bradley, Tony, "Introduction to Intrusion Detection Systems (IDS)," http://netsecurity.about.com/cs/hackertools/a/aa030504.htm and http://searchsecurity.techtarget.com/sDefinition/0,,sid14_gci295031,00.html. , downloaded Jan. 11, 2005.

Mertz, David, "Learning to Use Regular Expressions, Introduction to the Tutorial," Gnosis Software, http://gnosis.cx/publish/programming/regular_expressions.html, pp. 1-16, downloaded Jan. 11, 2005.

Vahid, F., "The Softening of Hardware," Computer, 36(4): 27-34 (Apr. 2003).

McConnell, S., "Who Needs Software Engineering?" IEEE Software, 18(1): 5-8 (Jan.-Feb. 2001).

Tewari, et al., A Parallel DFA Minimization Algorithm, S. Sahni, et al. (Eds.) HiPC 2002, LNCS 2552, pp. 31-40, 2002.

Ciura, et al., "How to Squeeze a Lexicon," Software-Practice and Experience, 31(11):1077-1090, 2001.

Dharmapurikar, et al., "Design and Implementation of a String Matching System for Network Intrusion Detection using FPGA-based Bloom Filters," *Washington University Dept. of Computer Science and Engineering*: Technical Report WUCS-2004-012 (2004).

Ramakrishnan, et al., "Entity Annotation Based on Inverse Index Operations," Proceedings of the 2006 Conference on Emperical Methods in Natural Language Processing (EMNLP 2006), pp. 492-500, Sydney, Jul. 2006).

Tanenbaum, A., "Structured computer organization" (2nd ed.), Prentice-Hall, Inc., Upper Saddle River, NJ, pp. 10-12 (1984).

Alicherry et al., "High Speed Pattern Matching for Network IDS/IPS," IEEE, pp. 187-196, 2006.

Candan et al., "Afilter: Adaptable XML Filtering with Prefix-Caching and Suffix-Caching," VLDB '06 Sep. 12-15, 2006, Seoul, Korea, pp. 559-570.

\* cited by examiner

INPUT STREAM: BCONWXCONTENTJ

| EXPRESSIONS TO BE SEARCHED | NODE PATH |
|---|---|
| 'CON' | 0→1→2→3 |
| 'CONTENT' | 0→1→2→3→4→6→7→9 |
| 'CONTENTS' | 0→1→2→3→4→6→7→9→16 |
| 'CONTEXT' | 0→1→2→3→4→6→8→10 |
| 'CONTINUE' | 0→1→2→3→4→5→11→12→13 |
| 'CONTINUUM' | 0→1→2→3→4→5→11→12→14→15 |

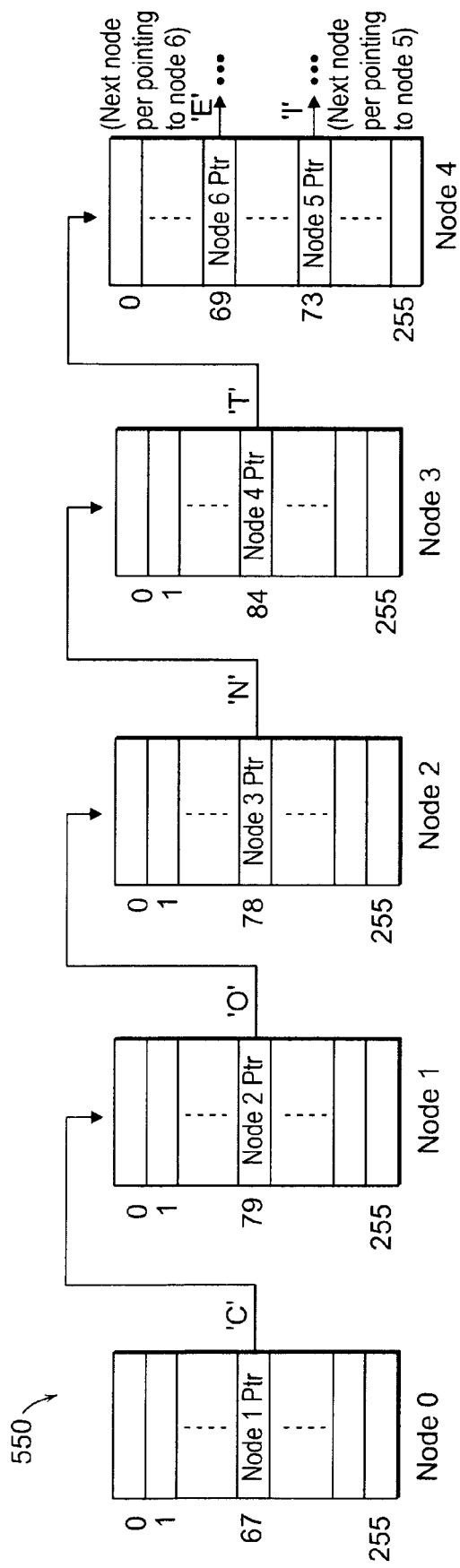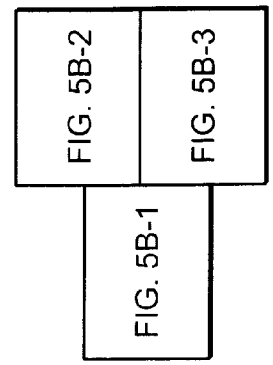
FIG. 5B-1
FIG. 5B

Node Structure looks like:

```
typedef struct {    /← 505
  ARC arcs[256];
} Node;
```

```
typedef struct {    /← 507
  uint32_t flags :m;
  uint32_t arc_ptr :n;
  uint32_t reserved :o;
} ARC ;
```

Value of m, n & o will depend on implementation. m+n+o = 32.

Size of each ARC is 32 bits i.e. 1 word.

Basic walker logic:

1) get root node pointer and assign it to 'node_ptr';
2) read next input character and assign its ascii value to 'ch';
3) if (end of input stream)
     go to step 8
4) Use 'ch' to index into 'node_ptr' and get arc for this character. i.e.
     arc = node_ptr[ch]; or
     arc = node_ptr + (ch * size of (ARC));
5) Check flags of arc. i.e. whether next node is match node or marked node
   or some special node. Accordingly generate result.
6) Extract next node ptr from arc and assign it to 'node_ptr'.
7) Go to step 2.
8) Finish.

FIG. 5C

Node Structure looks like:

```
typedef struct {
   ARC arcs[];
} Node;

typedef struct {
   uint64_t ch :x ;
   uint64_t hash :y ;            ← 905
   uint32_t flags :m;
   uint32_t arc_ptr :n;
   uint32_t reserved :o ;
} ARC ;
```

Value of x, y, m, n & o will depend on implementation. x+y+m+n+o = 64.

Size of each ARC is 64 bits i.e. 1 double word. Based on implementation, it can be 1 word as well i.e. 32 bits.

Basic walker logic:

1) get root node pointer and assign it to 'node_ptr';
2) get root hash function and assign it to 'hash_fn';
3) read next input character and assign its ascii value to 'ch';
4) if (end of input stream)
    go to step 13
5) Use 'hash_fn' to generate hash index for 'ch' and assign to 'index'. Use this index to get potential arc for this character. i.e.
    arc = node_ptr[index]; or
    arc = node_ptr + (index * size of (ARC));
6) Extract actual character stored in the arc and assign to 'arc_ch'.
7) Check if 'ch' is same as 'arc_ch'.
8) If yes.
    then go to step 9
    else go to step 1
9) Check flags of arc. i.e. whether next node is match node or marked node or some special node. Accordingly generate result.
10) Extract next node ptr from arc and assign it to 'node_ptr'.
11) Extract hash function of next node from arc and assign it to 'hash_fn'.
12) Go to step 3.
13) Finish.

FIG. 9

DETERMINISTIC FINITE AUTOMATA (DFA) GRAPH COMPRESSION

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor can perform the compute intensive tasks, it does not provide sufficient performance to process the data so that it can be forwarded at wire-speed.

Content aware networking requires inspection of the contents of packets at "wire speed." The content may be analyzed to determine whether there has been a security breach or an intrusion. A large number of patterns and rules in the form of regular expressions are applied to ensure that all security breaches or intrusions are detected. A regular expression is a compact method for describing a pattern in a string of characters. The simplest pattern matched by a regular expression is a single character or string of characters, for example, /c/ or /cat/. The regular expression also includes operators and meta-characters that have a special meaning.

Through the use of meta-characters, the regular expression can be used for more complicated searches such as, "abc*xyz". That is, find the string "abc", followed by the string "xyz", with an unlimited number of characters in-between "abc" and "xyz". Another example is the regular expression "abc??abc*xyz;" that is, find the string "abc,". followed two characters later by the string "abc" and an unlimited number of characters later by the string "xyz."

An Intrusion Detection System (IDS) application inspects the contents of all individual packets flowing through a network, and identifies suspicious patterns that may indicate an attempt to break into or compromise a system. One example of a suspicious pattern may be a particular text string in a packet followed 100 characters later by another particular text string.

Content searching is typically performed using a search algorithm such as, Deterministic Finite Automata (DFA) to process the regular expression. The DFA processes an input stream of characters sequentially using a DFA graph and makes a state transition based on the current character and state.

SUMMARY

Typically, a design trade-off must be made in the implementation of DFA graph search systems. The trade-off is between creating a compressed DFA graph which may decrease complexity of the graph and may comprise a lower memory requirement for storage, but may require multiple (more than one) external memory accesses for each input character processed.

Alternatively, a larger and more complex DFA graph may be utilized that may require only a single memory access per character, but at the cost of a large memory requirement for storage. The tradeoff is between graph size (memory) requirement and processing time.

In an embodiment of the present invention, a compressed DFA graph is presented which achieves the best of both worlds (i.e., provides a reduced graph size and a lesser processing time). The compressed DFA graph will not only comprises a low memory requirement, but may also require only one memory access for the processing of each input character.

In an embodiment of the present invention a processor and corresponding method for traversing a compressed DFA is presented. The processor may comprise a memory unit configured to store a graph having a plurality of nodes interconnected through valid arcs. The processor may also comprise a walker configured to walk the plurality of nodes in the graph to search for an expression in an input stream by utilizing a hash value to manage a retrieval function of the walker. The graph may be a compressed graph including no redundant arcs.

The walker may be configured to travel node to node through a valid arc, where a current valid arc of a current node leads to a next node, the current valid arc representing a character match in the expression. The walker may be further configured to employ a hash function to generate a hash value associated with a next input character, the walker process may be configured to index into the next node with the generated hash value, to read a next valid arc, the next valid arc including a copy of a next character. The hash function may be a common hash function for the entire graph and stored in graph metadata. Each valid arc may also comprise a hash function associated with the next node it points to.

The walker may also be configured to compare the next input character with the copy of the next character, where the next input character matches a next character of the expression when a comparison match is detected. The walker may be configured to traverse the graph to a designated node when a comparison match is not detected. The walker may also be configured to traverse the graph to a designated node associated with a current sub-graph when a comparison match is not detected.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 5C is an example of pseudo code used to control a walker process traversing the DFA graph of FIGS. 5B(1)-5B(3);

FIG. 9 is an example of pseudo code used to control a walker process of the example of FIG. 8.

DETAILED DESCRIPTION

Figure 1A:
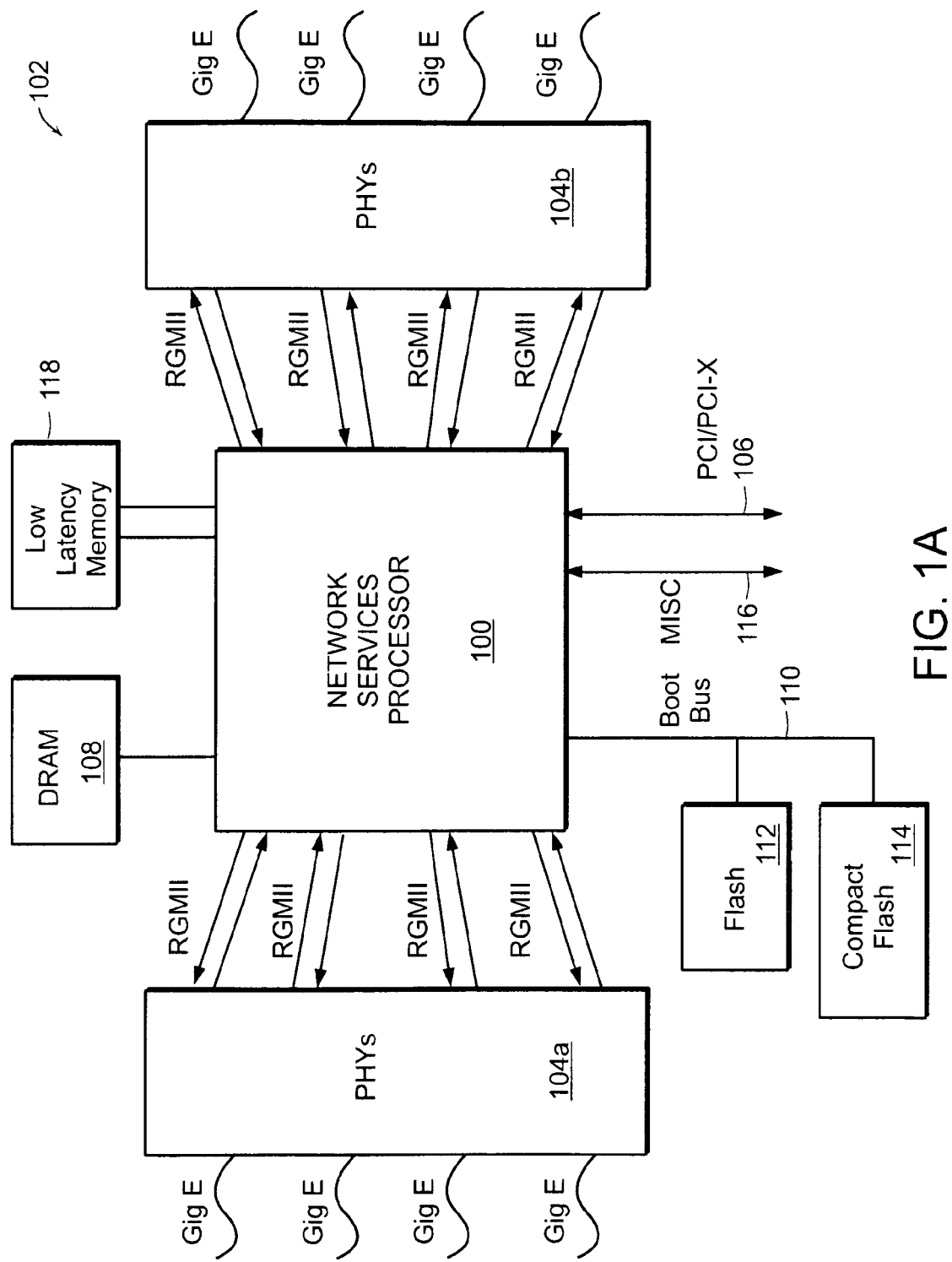
FIGS. 1A and 1B are block diagrams of a security appliance including a network services processor and a protocol processor, respectively.

FIG. 1A is a block diagram of an example security appliance 102 including a network services processor 100. The security appliance 102 may be a standalone system that may switch packets received at one Ethernet port (Gig E) to another Ethernet port (Gig E) and perform a plurality of security functions on received packets prior to forwarding the packets. For example, the security appliance 102 may be used to perform security processing on packets received on a Wide Area Network prior to forwarding the processed packets to a Local Area Network.

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

The network services processor 100 may include a plurality of Ethernet Media Access Control interfaces with standard Reduced Gigabyte Media Independent Interface (RGMII) connections to the off-chip PHYs 104a, 104b.

The network services processor 100 may also receive packets from the Ethernet ports (Gig E) through the physical interfaces PHY 104a, 104b, and perform L7-L2 network protocol processing on the received packets and forwards processed packets through the physical interfaces 104a, 104b to another hop in the network or the final destination or through the PCI bus 106 for further processing by a host processor. The network protocol processing may include processing of network security protocols such as Firewall, Application Firewall, Virtual Private Network (VPN) including IP Security (IPSec) and/or Secure Sockets Layer (SSL), Intrusion Detection System (IDS) and Anti-virus (AV).

The network services processor 100 may also include a low latency memory controller for controlling low latency Dynamic Random Access Memory (DRAM) 118. The low latency DRAM 118 may be used for Internet Services and Security applications allowing fast lookups, including the string-matching that may be required for Intrusion Detection System (IDS) or Anti Virus (AV) applications and other applications that require string matching.

The network services processor 100 may perform pattern search, regular expression processing, content validation, transformation and security accelerate packet processing according to an embodiment of the present invention. The regular expression processing and pattern search may be used to perform string matching for AV and IDS applications and other applications that require string matching.

A DRAM controller in the network services processor 100 may control access to an external Dynamic Random Access Memory (DRAM) 108 that is coupled to the network services processor 100. The DRAM 108 may store data packets received from the PHYs interfaces 104a, 104b or the Peripheral Component Interconnect Extended (PCI-X) interface 106 for processing by the network services processor 100. In one embodiment, the DRAM interface supports 64 or 128 bit Double Data Rate II Synchronous Dynamic Random Access Memory (DDR II SDRAM) operating up to 800 MHz. The DRAM may also store rules data required for lookup and pattern matching in DFA graph expression searches.

A boot bus 110 may provide the necessary boot code which may be stored in flash memory 112 and may be executed by the network services processor 100 when the network services processor 100 is powered-on or reset. Application code may also be loaded into the network services processor 100 over the boot bus 110, from a device 114 implementing the Compact Flash standard, or from another high-volume device, which can be a disk, attached via the PCI bus.

The miscellaneous I/O interface 116 offers auxiliary interfaces such as General Purpose Input/Output (GPIO), Flash, IEEE 802 two-wire Management Interface (MDIO), Universal Asynchronous Receiver-Transmitters (UARTs) and serial interfaces.

Figure 1B:
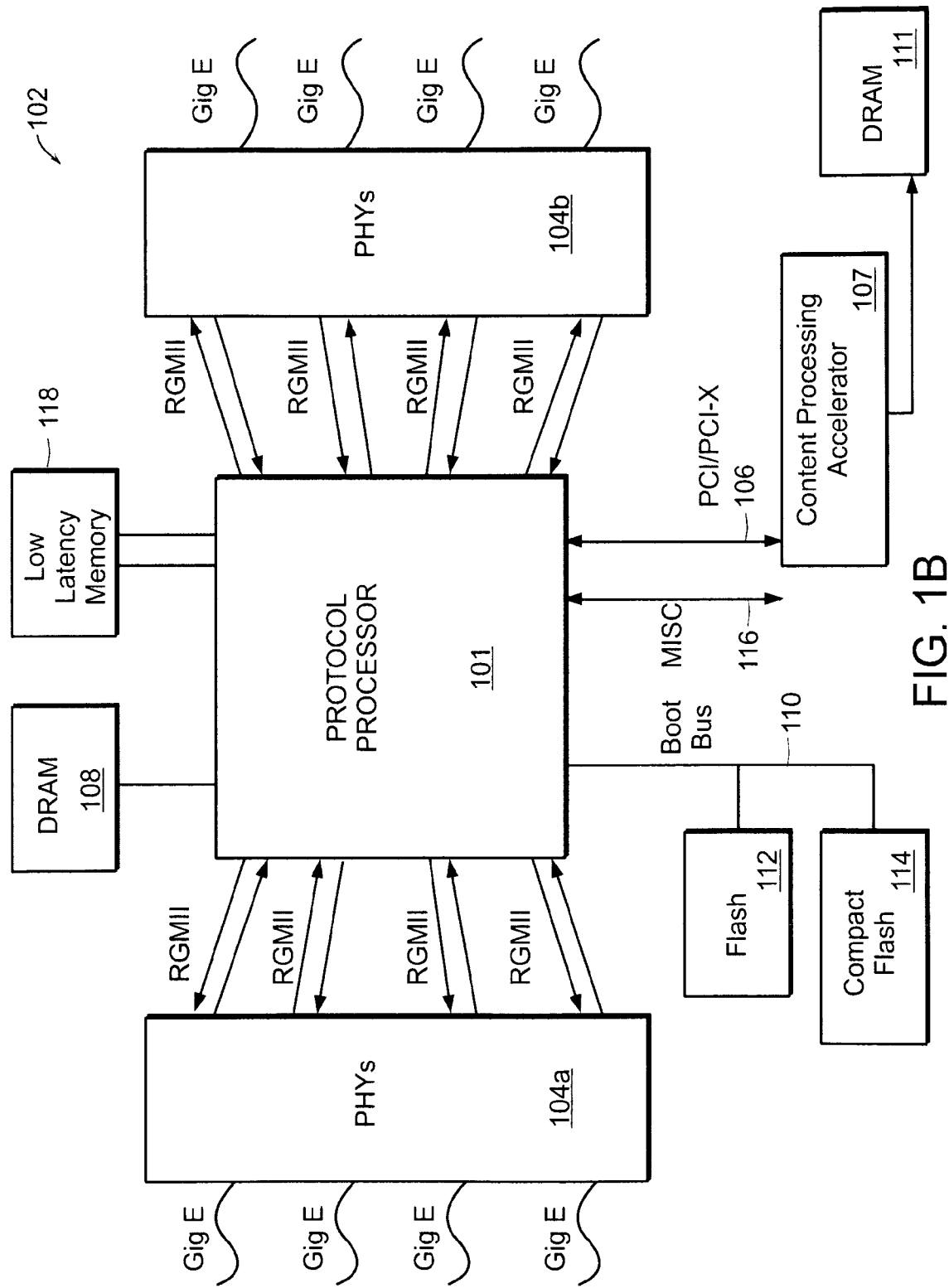

It should be appreciated that the example security appliance 102 may alternatively include a protocol processor 101 (FIG. 1B). The protocol processor 101 may include the element of the network services processor 100 with the addition of a content processing accelerator 107, connected to the processor 101 via the PCI/PCI-X connection 106, and an external DRAM i 11 connected to the accelerator 107. The accelerator 107 and DRAM 111 may be employed in content search applications, therefore making all content searching operations external to the processor 101.

Figure 2:
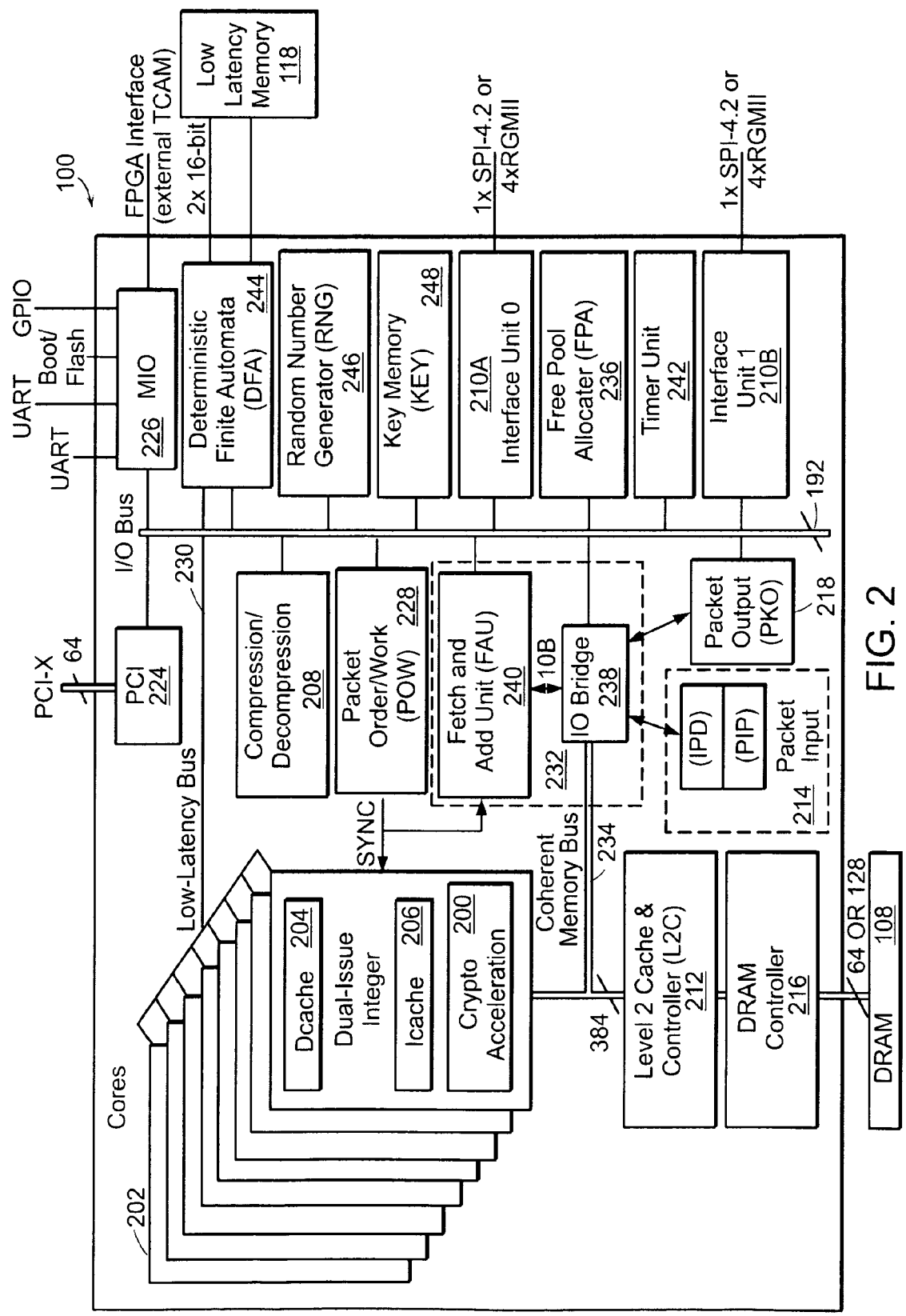
FIG. 2 is a block diagram of the network services processor shown in FIG. 1A.

FIG. 2 is a block diagram of the network services processor 100, or the protocol processor 101 shown in FIGS. 1A and 1B, respectively. The network services processor 100, and/or the protocol processor 101, delivers high application performance using a plurality of processors (cores) 202 located on a L1 network protocol. Network applications may be categorized into data plane and control plane operations. Each of the cores 202 may be dedicated to performing data plane or control plane operations. A data plane operation may include packet operations for forwarding packets. A control plane operation may include processing of portions of complex higher level protocols such as Internet Protocol Security (IPSec), Transmission Control Protocol (TCP) and Secure Sockets Layer (SSL). A data plane operation may include processing of other portions of these complex higher level protocols.

A packet may be received by any one of the interface units 210a, 210b through a SPI-4.2 or RGM II interface. A packet may also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 may perform pre-processing of L3 and L4 network protocol headers included in the received packet. The pre-processing includes checksum checks for Transmission Control Protocol (TCP)/User Datagram Protocol (UDP) (L3 network protocols).

The packet input unit 214 may write packet data into buffers in Level 2 cache 212 or DRAM 108 in a format that is convenient to higher-layer software executed in at least one processor 202 for further processing of higher level network protocols. The packet input unit 214 may also support a programmable buffer size and can distribute packet data across multiple buffers to support large packet input sizes.

The Packet order/work (POW) module (unit) 228 may queue and schedule work (packet processing operations) for the processor 202. Work is defined to be any task to be performed by a processor that is identified by an entry on a work queue. The task can include packet processing operations, for example, packet processing operations for L4-L7 layers to be performed on a received packet identified by a work queue entry on a work queue. Each separate packet processing operation is a piece of the work to be performed by a processor on the received packet stored in memory (L2 cache memory 212 or DRAM 108). For example, the work may be the processing of a received Firewall/Virtual Private Network (VPN) packet. The processing of a Firewall/VPN packet may include the following separate packet processing operations (pieces of work): (1) defragmentation to reorder fragments in the received packet; (2) IPSec decryption (3) IPSec encryption; and (4) Network Address Translation (NAT) or TCP sequence number adjustment prior to forwarding the packet.

The network services processor 100, and/or the protocol processor 101, may also include a memory subsystem. The memory subsystem may include level 1 data cache memory 204 in each processor 202, instruction cache in each processor 202, level 2 cache memory 212, a DRAM controller 216 for external DRAM memory and the interface 230 to external low latency memory 118. The memory subsystem is architected for multi-processor support and tuned to deliver both high-throughput and low-latency required by memory intensive content networking applications. Level 2 cache memory 212 and external DRAM memory 108 (FIGS. 1A and 1B) may be shared by all of the processors 202 and I/O co-processor devices.

The network services processor 100, and/or the protocol processor 101, may also include application specific co-processors that offload the processors 202 so that the network services processor achieves high-throughput. The application specific co-processors include a DFA co-processor 244 that performs Deterministic Finite Automata (DFA) and a compression/decompression co-processor 208 that performs compression and decompression.

Each processor 202 may be a dual-issue, superscalar processor with instruction cache 206, Level 1 data cache 204, built-in hardware acceleration (crypto acceleration module) 200 for cryptography algorithms with direct access to low latency memory over the low latency memory bus 230. The low-latency direct-access path to low latency memory 118 bypasses the L2 cache memory 212 and can be directly accessed from both the processors (cores) 202 and a DFA co-processor 244. In one embodiment, the latency to access the low-latency memory is less than 40 milliseconds.

Prior to describing the operation of the content search macros used for regular expression processing and pattern search in further detail, the other modules in the network services processor 100 will be described. In an example, after the packet has been processed by the processors 202, a packet output unit (PKO) 218 reads the packet data from L2 cache or DRAM, performs L4 network protocol post-processing (e.g., generates a TCP/UDP checksum), forwards the packet through the interface unit 210a, 210b and frees the L2 cache 212 or DRAM 108 locations used to store the packet.

Each processor 202 is coupled to the L2 cache by a coherent memory bus 234. The coherent memory bus 234 is the communication channel for all memory and I/O transactions between the processors 202, an I/O Bridge (IOB) 232 and the Level 2 cache and controller 212.

A Free Pool Allocator (FPA) 236 maintains pools of pointers to free memory in level 2 cache memory 212 and DRAM 108. A bandwidth efficient (Last In First Out (LIFO)) stack is implemented for each free pointer pool. If a pool of pointers is too large to fit in the Free Pool Allocator (FPA) 236, the Free Pool Allocator (FPA) 236 builds a tree/list structure in level 2 cache 212 or DRAM 108 using freed memory in the pool of pointers to store additional pointers.

The I/O Bridge (IOB) 232 manages the overall protocol and arbitration and provides coherent I/O partitioning. The IOB 232 includes a bridge 238 and a Fetch and Add Unit (FAU) 240. The bridge 238 includes buffer queues for storing information to be transferred between the I/O bus, coherent memory bus, the packet input unit 214 and the packet output unit 218.

The Fetch and Add Unit (FAU) 240 is a 2 KB register file supporting read, write, atomic fetch-and-add, and atomic update operations. The Fetch and Add Unit (FAU) 240 can be accessed from both the processors 202 and the packet output unit 218. The registers store highly-used values and thus reduce traffic to access these values. Registers in the FAU 240 are used to maintain lengths of the output queues that are used for forwarding processed packets through the packet output unit 218.

The PCI interface controller 224 has a DMA engine that allows the processors 202 to move data asynchronously between local memory in the network services processor and remote (PCI) memory in both directions.

Typically, content aware application processing utilizes a deterministic finite Automata (DFA) to recognize a pattern in the content of a received packet. The DFA is a finite state machine, that is, a model of computation including a set of states, a start state, an input alphabet (set of all possible symbols) and a transition function that maps input symbols and current states to a next state. Computation begins in the start state and changes to new states dependent on the transition function. The DFA is deterministic, that is, the behavior can be completely predicted from the input. The pattern is a finite number of strings of characters (symbols) to search for in the input stream (string of characters).

The pattern is commonly expressed using a regular expression that includes atomic elements, for example, normal text characters such as, A-Z, 0-9 and meta-characters such as, *, ^ and |. The atomic elements of a regular expression are the symbols (single characters) to be matched. These are combined with meta-characters that allow concatenation (+) alternation (|), and Kleene-star (*). The meta-character for concatenation is used to create multiple character matching patterns from a single character (or sub-strings) while the meta-character for alternation (|) is used to create a regular expression that can match any of two or more sub-strings. The meta-character Kleene-star (*) allows a pattern to match any number, including no occurrences of the preceding character or string of characters. Combining different operators and single characters allows complex expressions to be constructed. For example, the expression (th(is|at)*) will match the following character strings: th, this, that, thisis, thisat, thatis, or thatat.

The character class construct [ . . . ] allows listing of a list of characters to search for, e.g. gr[ea]y looks for both grey and gray. A dash indicates a range of characters, for example, [A-Z]. The meta-character "." matches any one character.

The input to the DFA state machine is typically a string of (8-bit) bytes, that is, the alphabet is a single byte (one character or symbol). Each byte in the input stream results in a transition from one state to another state.

The states and the transition functions can be represented by a graph, where each node in the graph represents a state and arcs in the graph represent state transitions. The current state of the state machine is represented by a node identifier that selects a particular graph node. The graph may be stored in low latency memory 118, or the main DRAM 108, and accessed by the processors 202 over the low latency bus. The processors 202 may access a DFA-based graph stored in the low latency memory, or the main DRAM 108, directly. The graph will be described later in conjunction with FIG. 5A.

Figure 3:
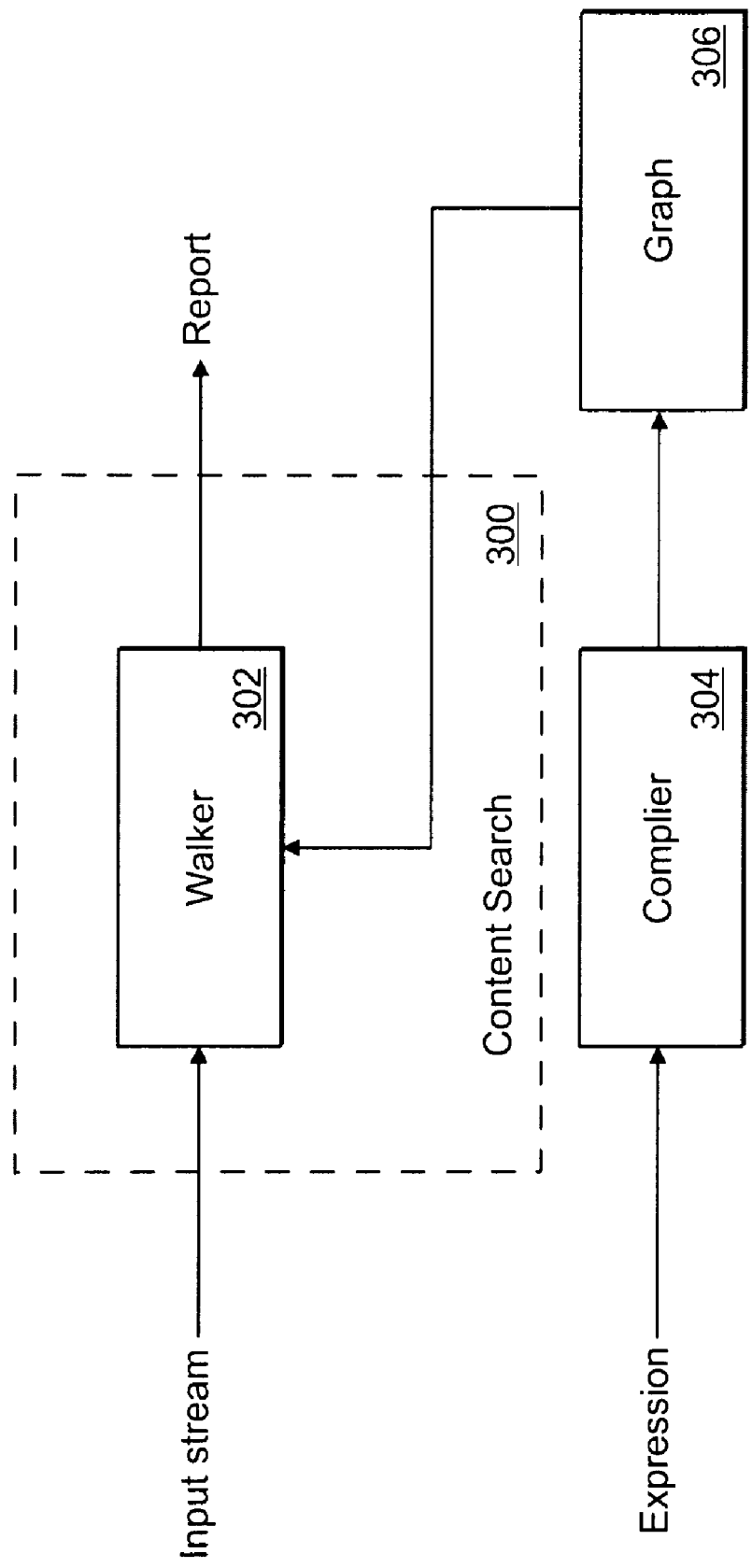
FIG. 3 is a block diagram illustrating content search elements used by the processor of FIGS. 1A and 1B.

FIG. 3 is a block diagram illustrating content search macros that may be used by a processor 202 in the network services processor 100 shown in FIG. 2. Content search macros 300 may include a walker software component (process) 302 for searching the DFA-based content search graph that may be generated via a compiler software component 304. The content search macros 300 may be stored in L2/DRAM (212, 108) and may be executed by a processor 202. The DFA-based content search graph may be stored in low latency memory 118 which is accessible directly by the processor 202 through the low latency bus and low-latency memory controller shown in FIG. 2. The compiler 304 translates expressions into a DFA-based content search graph with a plurality of nodes.

After the compiler 304 has generated the content search graph and the graph may be stored in low latency memory 118, the walker process 302 executed by one of the processors 202 walks input data (e.g., a string of characters) in the received data packet one character at a time and outputs a set of matches based on a search for a pattern in the input data using the content search graph.

Figure 4:
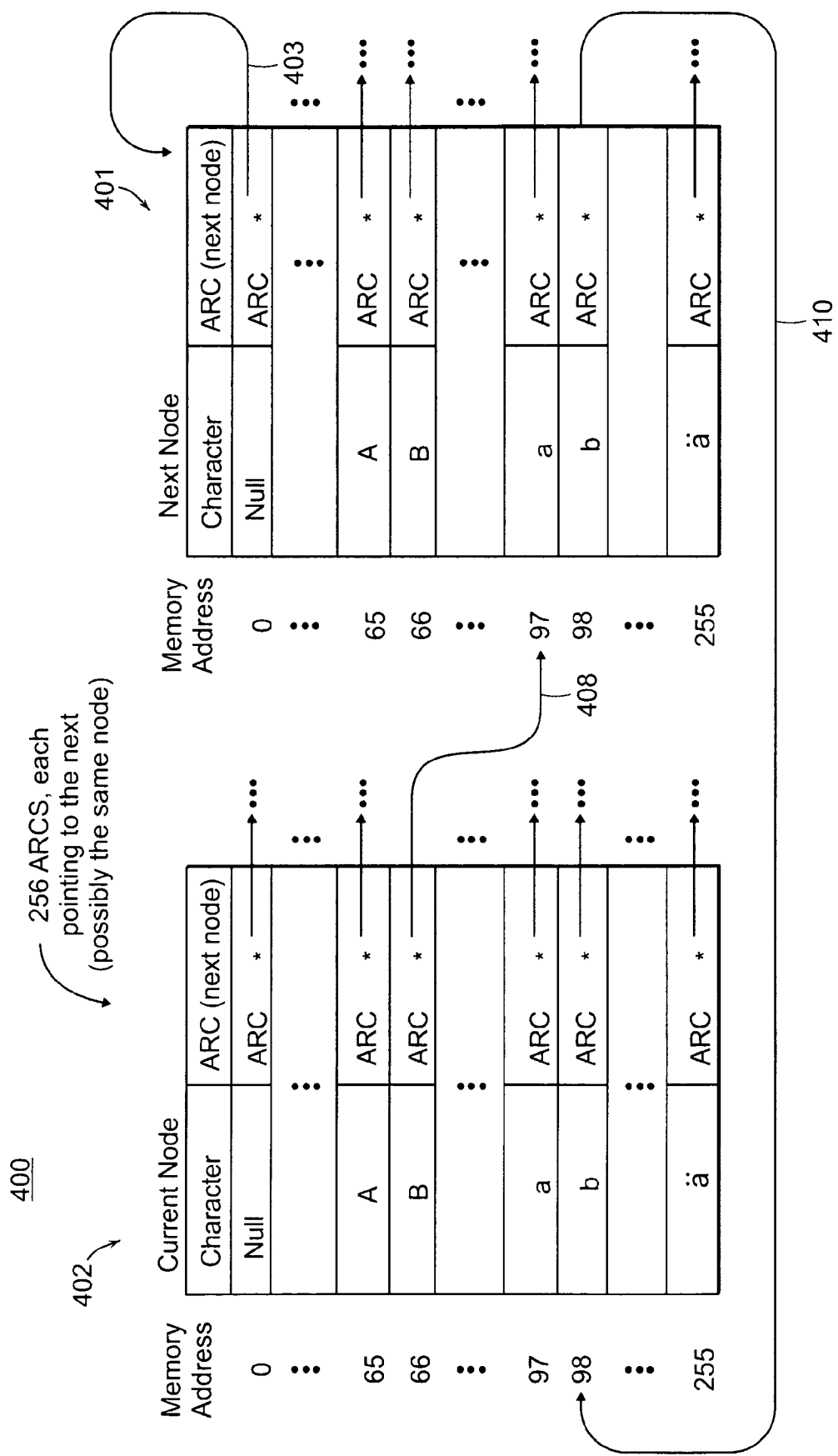
FIG. 4 is a block diagram of an example data structure that is used by the Content Search Mechanism (CSM) to traverse a graph.

FIG. 4 is a block diagram of an example of a typical data structure 400 that may be stored in Low Latency Memory Random Access Memory 118, or the main DRAM 108, and used by the Content Search Mechanism (CSM) executing in a processor 202 to traverse a graph. The data structure 400 may be generated by the compiler component 304 based on the expressions to be searched for in the input stream.

The data structure may include a plurality of nodes, for example nodes 402 and 404, that may be used in a content search graph according to an embodiment of the present invention. Each node in the graph may include an array of 256 next node pointers, one for each unique input byte value; that is, $2^8$ (256 possible values, or 256 addresses) representing an ASCII value of the input. Each next node pointer contains a next node ID that directly specifies the next node/state for the input byte value.

As shown in FIG. 4, a current node 402 comprises 256 arcs. Each arc represents an input ASCII value. For example, in node 404, the arc addressed as '97' includes a next node pointer for the character 'a.' Similarly, a next node 404 also comprises 256 arcs, each arc comprising a unique address and including a next node pointer for a corresponding ASCII value.

The arcs of a node may be forward arcs (e.g., arcs which point to next nodes in the DFA graph), backward arcs (e.g., arcs which point back to a root node or a prior node), or repeating arcs (e.g., arcs which point back to the node to which they are associated with). Arc 408 of node 404 comprises a node pointer to node 404, and is therefore an example of a repeating arc. Arc 410 of node 404 comprises a next node pointer to node 402, which in this context is considered to be a prior node, and therefore arc 410 is an example of a backward arc. In the example provided by FIG. 4, the arc addressed as '66' of current node 402 comprises a forward next node pointer 406 pointing to next node 404, representing a character match of 'B' with the input stream. It should be appreciated that although FIG. 4 only shows 2 nodes, any number of nodes may be included in a DFA based content search graph.

Figure 5A:
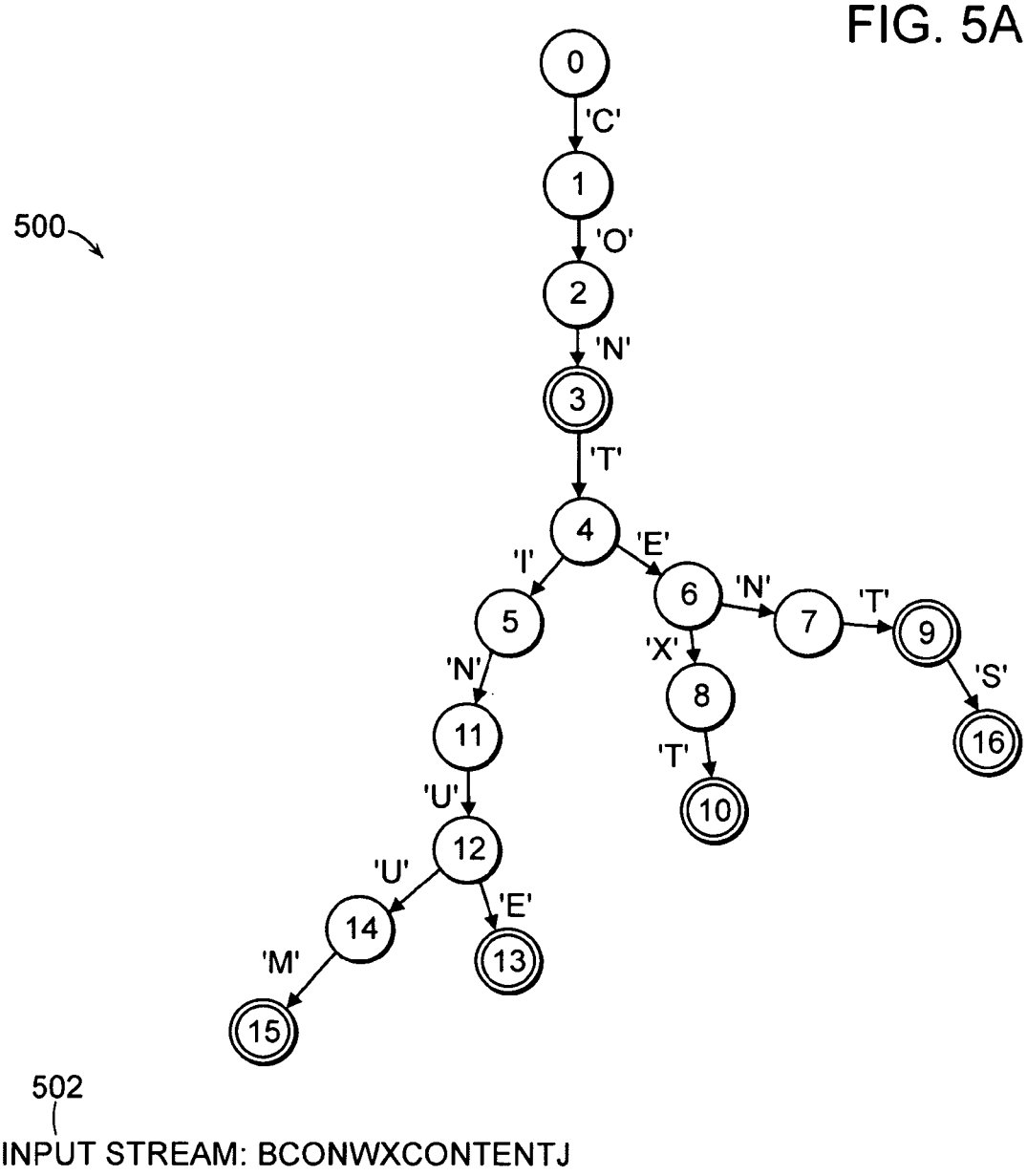
FIGS. 5A and 6 are examples of DFA graphs.
Figures 2, 5B:
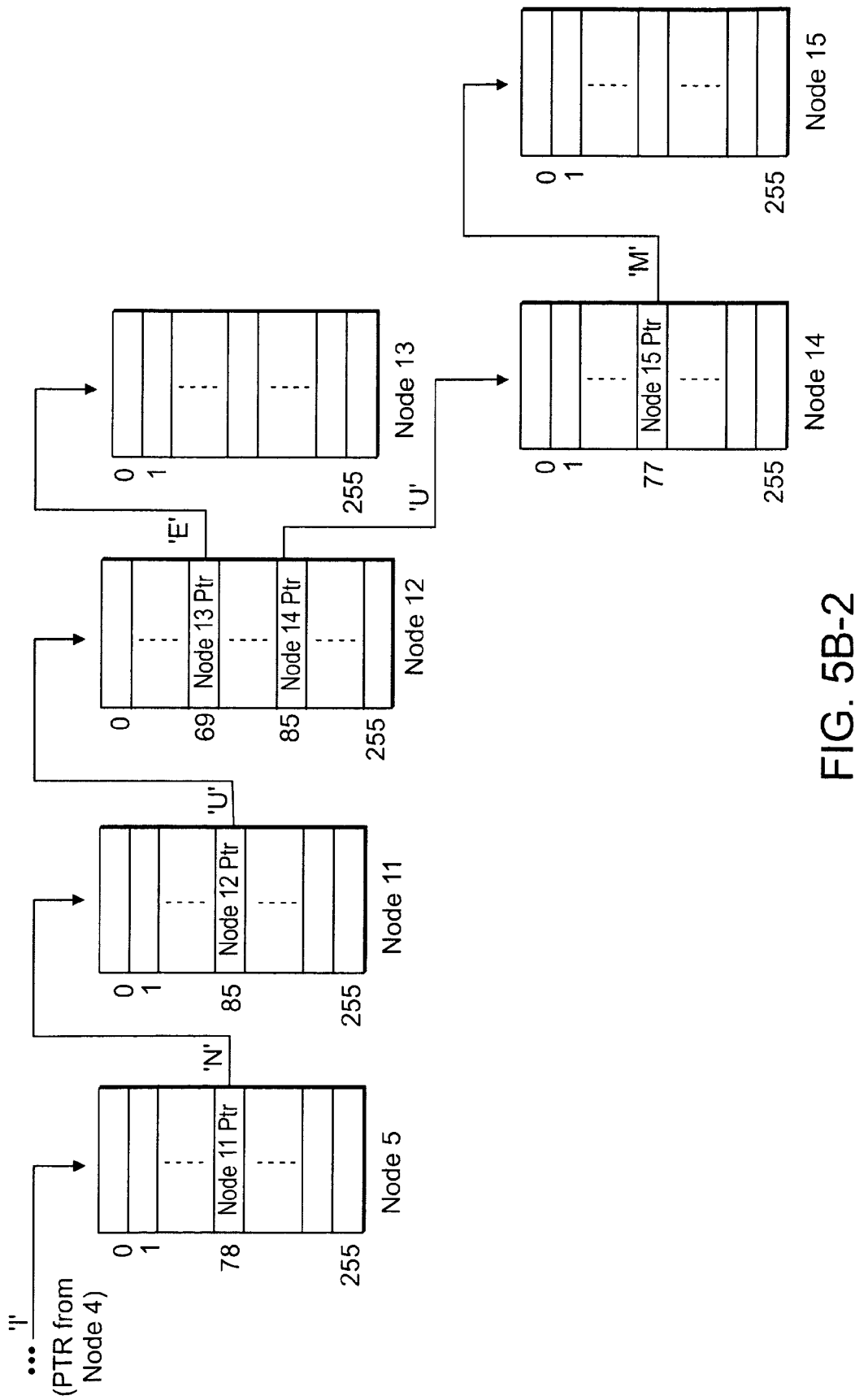
FIGS. 5B(1)-5B(3) are block diagrams of example data structures of the nodes of FIG. 5A.
Figures 3, 5B:
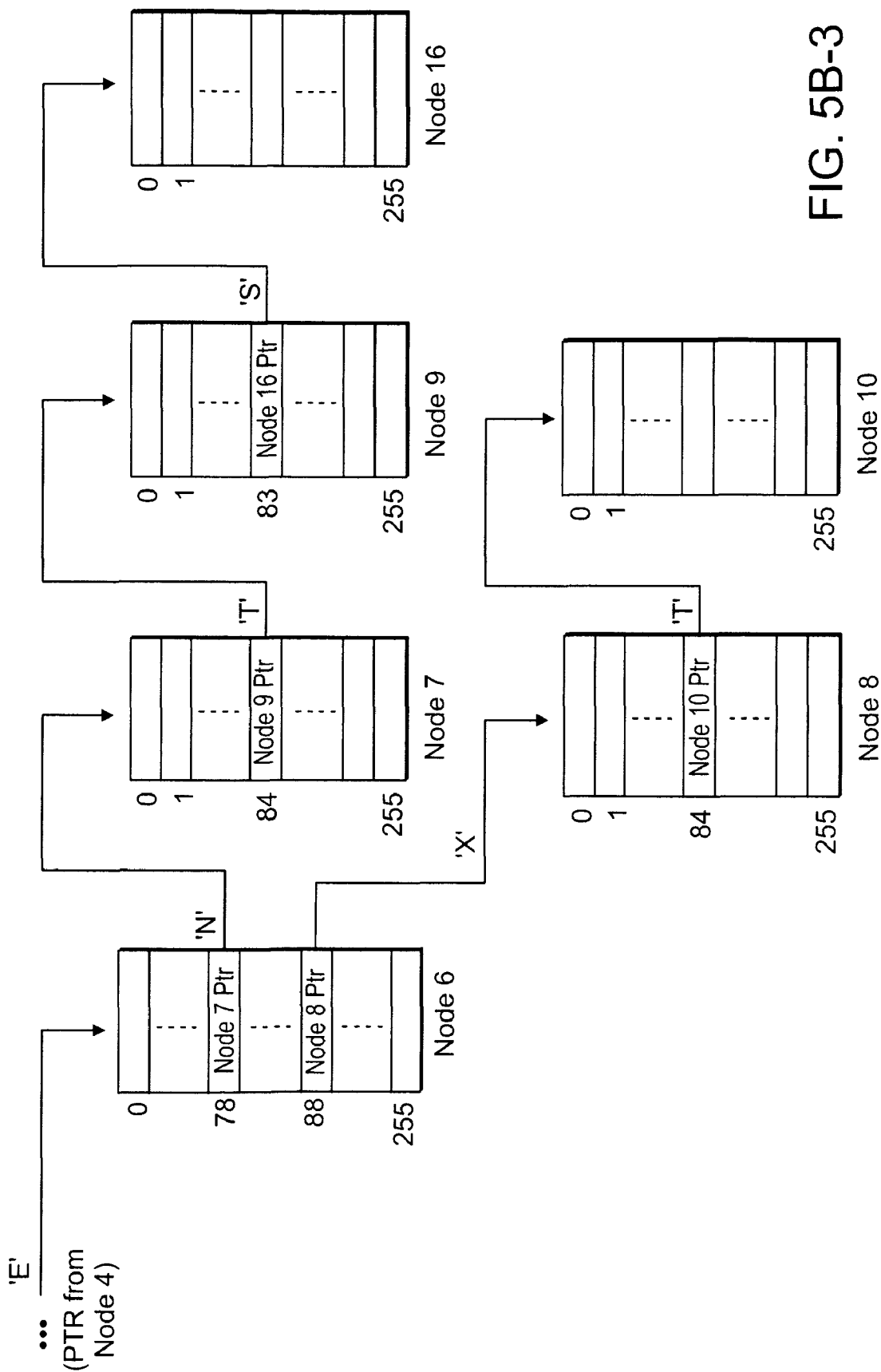

FIG. 5A provides an example of a DFA graph 500 complied via the compiler 304. For simplicity, only forward arcs have been illustrated in the example graph 500. A table 504 illustrates all of the possible expression matches, and the corresponding nodal paths, for the example DFA graph 500. FIGS. 5B(1)-5B(3) illustrate an example of the memory representation of the nodes in the uncompressed DFA graph 500, of FIG. 5A. Table 551 illustrates the relationship between the node characters and their corresponding ASCII values. FIG. 5C illustrates an example of pseudo code that may be employed by the walker process in traversing the uncompressed DFA graph 500.

In FIGS. 5B(1)-5B(3), the node marked as '0' is the root node and is a starting position for traversing the graph with the walker process 302. Each of the nodes are interconnected through arcs represented by the lines connecting each node. Each of the nodes '0'-'16' includes 256 arcs, stored in memory, indexed from 0 to 255, as shown to the left of each node. For the sake of clarity, the arcs in all the nodes which point to Node 0 (i.e. root node) are shown empty in FIG. 5B(1)-5B(3). For example, out of 256 arcs in Node 1, arc at index 79 point to next node 2 (as shown in FIG. 5B(1)) and rest of 255 arcs contain next node pointer pointing to Node 0. As shown in the pseudo code of FIG. 5C, the node structure may be defined 505 as a vector including 256 sections, each section corresponding to a unique arc in the node. An arc structure 507 may also be defined. In the present example provided by FIG. 5C, the arc structure is defined to be 32 bits in size including flags, arc pointers, and reserved space. In FIGS. 5B(1)- 5B(3) the index values are displayed on the left-hand side of each node for illustrative purposes, these index values are not stored in memory. Each arc comprised in the nodes may be accessed using the ASCII value, corresponding to the index values shown in FIGS. 5B(1)-5B(3), of a character under review, where each access requires an access into memory.

The arcs shown in FIG. 5A are forward arcs representing a character match between the expression being searched and an input character. Of the nodes shown in FIGS. 5B(1)-5B(3), nodes '0,' '1,' '2,' '3,' '5,' '7,' '8,' '9,' '11,' and '14' each include only one forward valid arc (e.g., an arc that provides a forward next node pointer to a node other than the root node). Nodes '4,' '6,' and '12' each include two forward valid arcs.

The nodes comprising a double line, as shown in FIG. 5A, (e.g., nodes 3, 9, 10, 13, 15, and 16) are referred to as mark nodes and represent a string match in the input stream. For example, the double line around node 3 represents a string match of 'CON'; node 9 represents a string match of 'CONTENT'; node 10 represents a string match of 'CONTEXT'; node 13 represents a string match of 'CONTINUE'; node 15 represents a string match of 'CONTINUUM'; and node 16 representing a string match of 'CONTENTS.' Nodes '10,' '13,' '15,' and '16' are leaf nodes. A leaf node is a node that is located at the end of a DFA branch and has each of its arcs pointing back to the root node. A leaf node is also typically a mark node representing the end of an expression match. The walker process may identify a leaf or mark node by a flag setting included in the node data structure. As an example, the flag in an arc may indicate that a next node is marked node. Therefore, the arc pointing to Node 3 (from Node 2 for character 'N') may have a flag setting indicating that the next node (which is Node 3) is marked node representing an expression match. If the flag setting indicates that a mark or leaf node has been traversed, the walker process may report that a match in the expression has been found.

Referring to FIGS. 5B(1)-5B(3), in operation, the walker process 302 may evaluate the input stream one byte at a time. As an example, consider the input stream 502. Initially, the walker process 302 may assign the root node pointer to a current node pointer variable 'node_ptr,' which will be evaluated (FIG. 5C, line 1). The walker 302 evaluates the first character of the input stream 502 which is 'B,' according to the pseudo code, the ASCII value of the first character may be assigned to the character variable 'ch' (FIG. 5C, line 2). The walker then proceeds to the root node to access the next node pointer associated with the character 'B.' The walker process may use the variable 'ch' to index in to the current node, which in the present example is the root node '0' (FIG. 5C, line 4). In the example provided by the DFA graph 500, as shown in FIG. 5B(1), the root node only includes a forward match for the character 'C.' In the case that a forward valid arc pointing to a mark node is detected, a flag may be set 507 indicating that an expression match has been found. In example embodiments of the present invention, the walker process may monitor flag settings to determine if a mark node has been traversed and if an expression match has been found (FIG. 5C, line 5).

In the current example, the arc associated with the character 'B' is a repeating arc (not shown). The presence of the repeating arc will not cause the flag 507 to be set and therefore, the walker process 302 may assigned the next node pointer variable 'node_ptr' to the arc associated with the character 'B' resulting in the walker process 302 to continue evaluating the root node '0' (FIG. 5C, line 6).

The walker process 302 then proceeds to the next character in the input stream 502 which is 'C,' and reassigns the character variable 'ch' to the ASCII value of the current character 'C' (FIG. 5C, lines 7 and 2). Upon locating the arc associated with the ASCII value of the character 'C,' the walker 302 finds a next node pointer providing a forward match and pointing to node '1' (FIG. 5C, line 4). Since, node '1' is not a mark node, the flag status will remain unchanged (FIG. 5C, line 5). Thereafter, the walker process 302 intakes the next input stream character 'O,' and proceeds to find the associated arc and next node pointer providing a forward match and leading to node '3' (FIG. 5C, lines 6, 7, and 2-4). Since node '3' is a mark node, a flag 507 may be set causing the walker process 302 to register that an expression match for the string 'CON' in the input stream has been found (FIG. 5C, line 5).

Depending on the specific application, the walker process 302 may proceed to evaluate the next character in the input stream 502, which is the character 'W' (FIG. 5C, lines 6, 7, and 2-5). The arc in node '3' associated with the character 'W' comprises a backward next node pointer to the root node '0,' the only forward match associated with node '3' is for the character 'T.' Thus, the walker process 302 follows the next node pointer associated with the character 'W' and proceeds to the root node '0' (FIG. 5C, lines 6 and 7). Thereafter, the walker process 302 proceeds to evaluate the next character in the input stream 502, which is 'X' and reassigns the character variable 'ch' equal to the ASCII value associated with the character 'X' (FIG. 5C, line 2).

Upon evaluating the next input character 'X,' it is determined that the arc associated with the character 'X' in the root node '0' includes a repeating next node pointer pointing to the root node '0' (FIG. 5C, line 4). Thus, the walker process 302 will proceed to evaluate the next character in the input stream. Following the same logic discussed above, the walker process 302 may proceed to find an expression match for the string 'CONTENT' in mark node '9.' Upon reading the next character 'J,' the walker process traverses back to the root node '0' and the arc and next node pointer associated with the character 'J' are read from the root node '0.' Upon detecting a repeating arc and reaching the end of the input stream 502, the walker process 302 completes its walking of the DFA graph 500 (FIG. 5C, lines 3 and 8).

Figure 6:
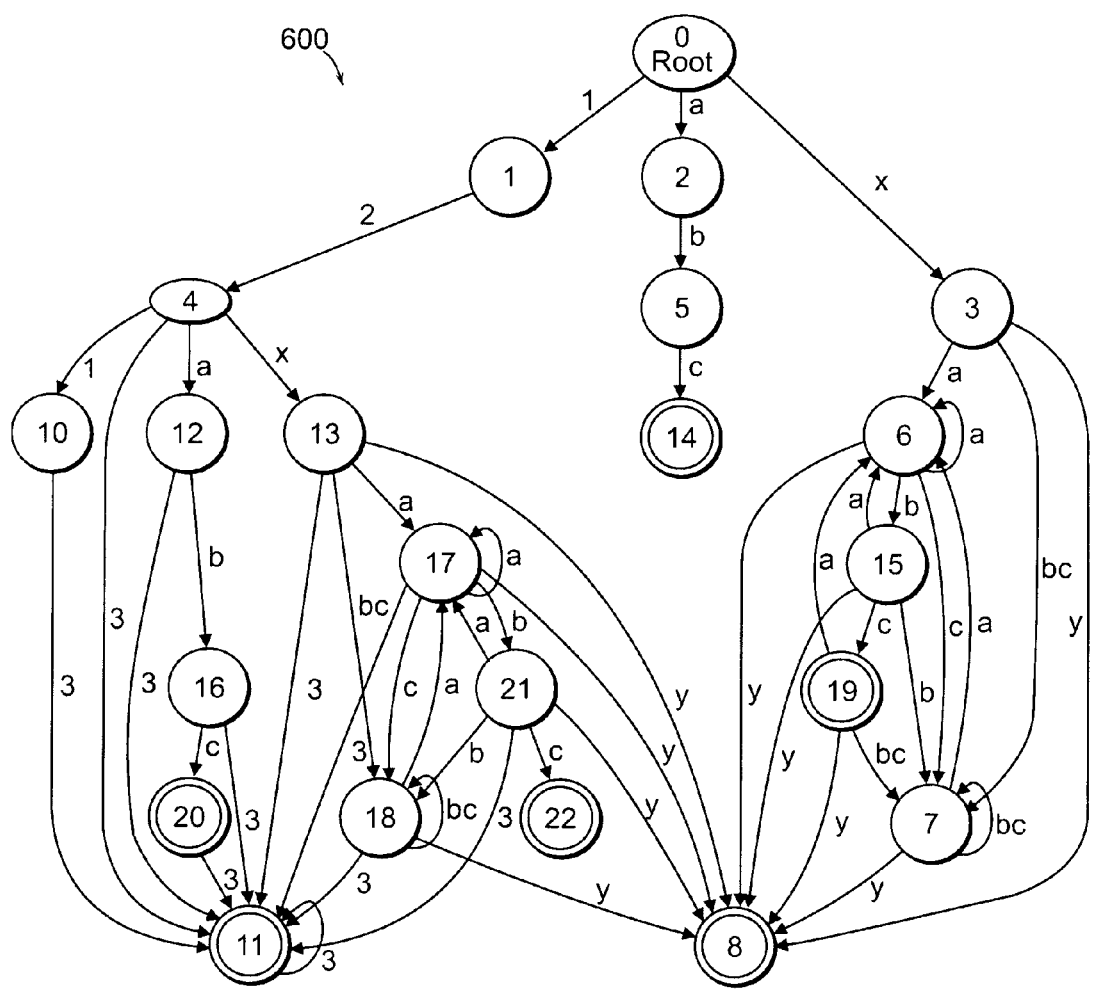

The examples provided by FIGS. 5A and 5B(1)-5B(3) illustrate a simplified DFA graph. FIG. 6 provides an illustration of a more realistic view of only a sub-portion of a DFA graph. Again, the backward arcs to the root node of each node have not been shown for simplicity. The DFA graph 600 comprises a number of branches which are interconnected. A DFA graph such as the one shown in FIG. 6 requires a substantial amount of memory to store, as well as a significant amount of time and system resources to traverse the graph.

Typically, a design trade-off must be made in the implementation of DFA graph search systems. The trade-off is between creating a compressed DFA graph which may decrease complexity of the graph and may comprise a lower memory requirement for storage, but may require two to three memory accesses for each input character. Alternatively, a larger and more complex DFA graph may be utilized that may require only a single memory access per input character, but at the cost of a large memory requirement for storage.

Figure 7:
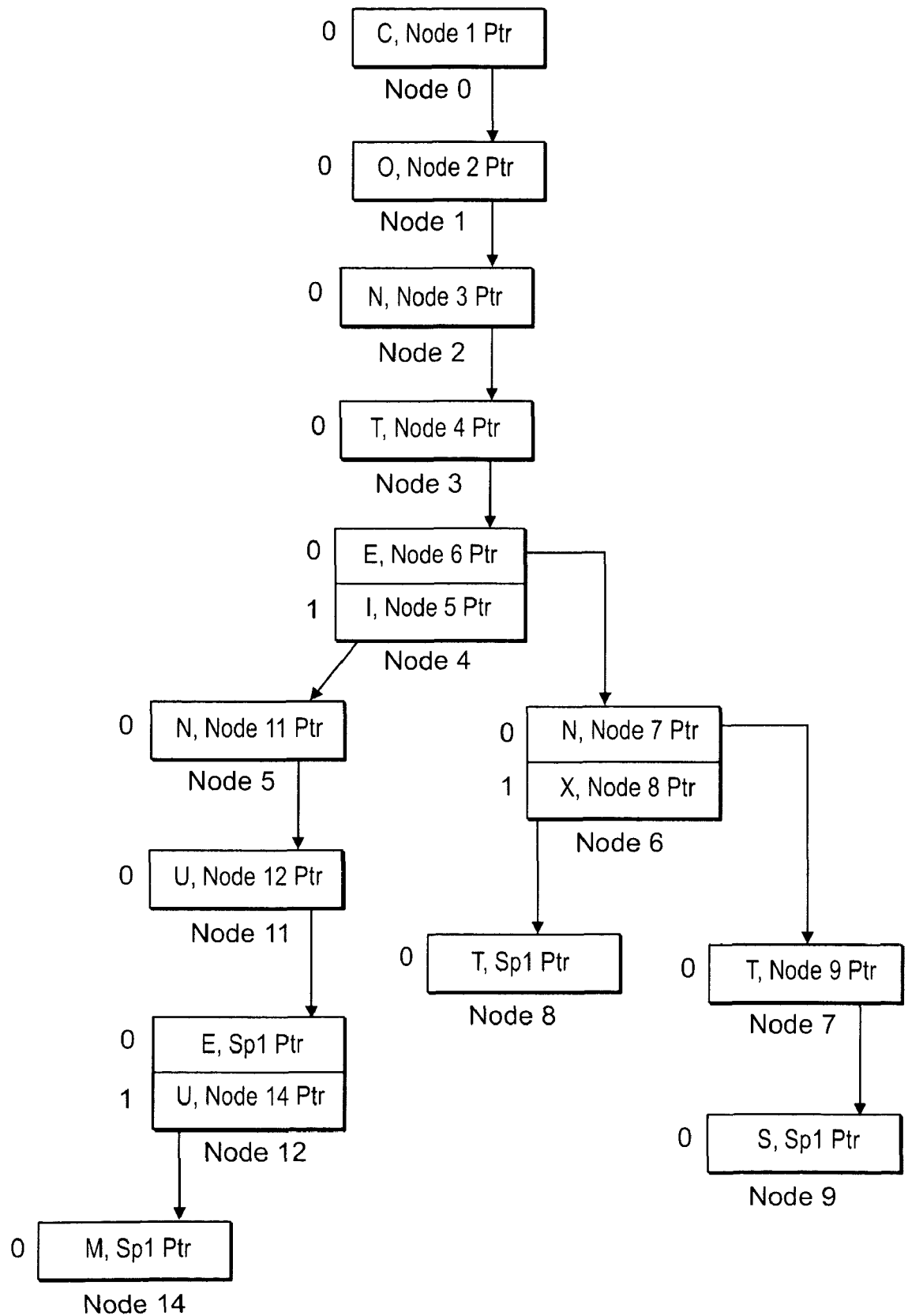
FIG. 7 is block diagram of an example data structure of the nodes of FIG. 5A upon compression.

In an embodiment of the present invention, a compressed DFA graph is presented. The compressed DFA graph that has the advantages of low memory utilization and single memory access per the reading of each input character. In an embodiment of the present invention, all arcs which point back to the root node, or a designated node, are deleted from all other nodes and are not stored in memory as part of graph. FIG. 7 provides an illustrative example of the nodes of a compressed version of the DFA graph using this embodiment for uncompressed graphs shown in FIGS. 5A and 5B(1)-5B(3). In contrast to the nodes of FIGS. 5B(1)-5B(3), the nodes of FIG. 7 include only valid arcs (e.g., arcs which represent a character match in an expression). Furthermore, the valid arcs included in the compressed nodes comprises a copy of the character the arc is associated with as well as a next node pointer, as is shown in FIG. 7.

In a compressed node, all arcs which are not associated with a expression match are pruned or deleted. Nodes '0,' '1,' '2,' '3,' '5,' '7,' '8,' '9,' '11,' and '14' of FIG. 5B each included 256 arcs with only one valid arc. The same nodes, as compressed in FIG. 7, include only one arc, which is indexed as '0' as shown to the left of each node. Similarly, the uncompressed nodes '4,' '6,' and '12' of FIG. 5B included 256 arcs with only two arc being valid. The compressed versions of nodes '4,' '6,' and '12' of FIG. 7 include only two arcs, which are valid arcs indexed as '0' and '1.' The leaf nodes '10,' '13,' '15,' and '16' have been pruned or deleted in the compressed DFA graph. Arcs in compressed nodes which originally pointed to leaf nodes in the uncompressed DFA graph (e.g., nodes '8,' '9,' and '14') may include a form of identification (e.g., a special pointer 'Spl ptr') that may be used by the walker process as an indication the searching for a particular expression has ended.

In another embodiment of present invention, a set of designated nodes (including at least 1 node) may be identified. All the arcs of all nodes, which point to same next node for corresponding character as (one of) the designated node does, are pruned and not stored in Nodes. Taking the DFA graph of FIG. 6 as an example, if node '13' was assigned as a designated node, all of the arcs pointing to node '8' for the character 'y' are pruned (e.g., the arcs associated with the character 'y' from nodes '3,' '6,' '7,' '15,' '18,' '19,' '17,' and '21'; with the exception of the designated node '13'), all the arcs pointing to node '11' for the character '3' are deleted (e.g., the arcs associated with the character '3' from nodes '4,' '10,' '12,' '16,' '17,' '18,' '20,' and '21'; with the exception of the designated node '13'), all arcs pointing to node '17' for the character 'a' are deleted (e.g., the arcs associated with the character 'a' from nodes '18,' and '21'; with the exception of the designated node '13'), and all the arcs pointing to node '18' for the character 'b' (e.g., the arc associated with the character 'b' from node '21'; with the exception of the designated node '13') are deleted as well. The deleted arcs in each node leave holes in the node data structure. These holes may then be compressed in order to save memory and required storage space.

As mentioned before, there may be multiple designated nodes which may allow further arc pruning. There may be different designated nodes for different sub-sections of the DFA graph. Pruned nodes may contain information about the designated node used for pruning. This information may also be stored in arc pointing to pruned node.

Graph compression using example embodiments of the present invention may greatly reduce memory requirements and processing speeds associated with the DFA graph. For example, in Intrusion Detections Systems (IDS) applications, it is possible to achieve a reduction in size of the DFA graph of at least 20× or greater. In Anti-Virus systems (AV), even greater DFA graph reduction may be obtained. The amount of graph reduction is highly application and signatures (i.e. patterns used to compile graph) dependent, but the insights used for this invention are fundamental to any DFA graph.

Due to the compression of memory to account for the holes, it is no longer possible to read the address of an arc via indexing an associated character's ASCII value. Therefore, in an embodiment of the present invention, a method for traversing a graph featuring compressed nodes and arcs is presented.

The walker process may be configured such that if a valid arc has not been found, the walker may default and traverse to a designated node. The address of the designated node may be included in metadata which may be stored in memory. It should be appreciated that the designated node need not be the root node and may instead be any node in the DFA graph.

Figure 8:
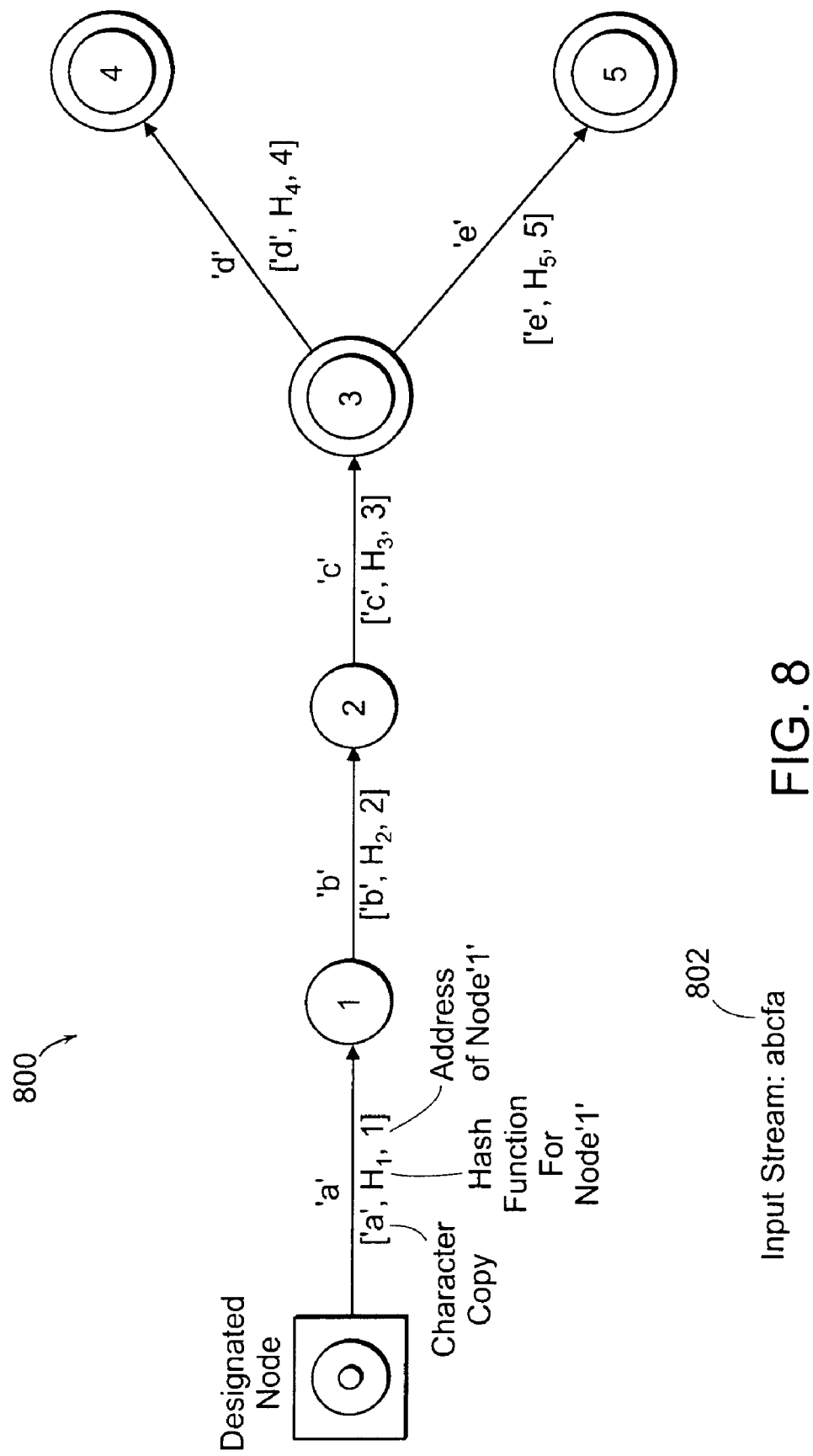
FIG. 8 is an illustrative example of DFA graph traversing.

FIG. 8 provides an illustrative example of how a walker process 302 may traverse a compressed graph (e.g., a graph with redundant arcs removed). FIG. 9 provides an example of pseudo code that may be used to manage the walker process 302 in a compressed DFA graph. In the example provided by FIG. 8, the root node '0' has been assigned by the compiler as the designated node. It should be appreciated that any node in the compressed DFA graph may be assigned as the designated node, and it should be further appreciated, as mentioned above, that the DFA graph may include any number of designated nodes.

In the DFA graph 800, each valid arc of a prior node '#−1' includes the following three items: (1) a copy of a character associated with an expression character match to a current node '#'; (2) a hash function 'H#' associated with a current node '#' which generates a hash value used to index into the current node '#' in order to find a next arc associated with a next node '#+1' and a next character; and (3) a node pointer pointing to the current node '#.' In contrast, the arcs in the DFA graphs of FIGS. 5A, 5C(1)-5C(3), and 6 only include item (3). The arc structure may also be defined to include a flag setting or status, as well as reserved memory as shown in 905. Depending on the implementation, an arc size may typically be 64 or 32 bits. It should be appreciated that any other arc size may be employed.

In operation, the walker process 302 may initially assign the next node pointer variable 'node_ptr' to point to the root node '0' and may also assign the hash function variable 'hash_fn' to the hash function associated with the root node '0' (FIG. 9, lines 1 and 2). Consider the input stream 802, the walker process 302 analyzes the first byte of the input stream 802 which is the character 'a' and assigns the ASCII value associated with the character 'a' to the character variable 'ch' (FIG. 9, line 3). In the case that the root node is compressed, the walker process 302 may utilize the hash function, using the variable 'ch,' associated with the root node in order to find the valid arc associated with the character 'a.' The hash function may produce a hash value ($i_0a$) that may be used to index in the root node '0' in order to find the arc associated with the character 'a' (FIG. 9, line 5).

A hash function is deterministic, therefore if two hash values generated from the same hash function are different, the two input values to the hash function must also be different. Based on this logic, a hash function never provides a false negative (e.g., the hash value of a character associated with a valid arc in a current node always correctly indexes to the arc), but however the hash function may provide a false positive (e.g., in the occurrence that input character is not associated with any valid arc, the hash function still provides an index to one of the arcs in the current node). Therefore, the walker process 302 may be configured to test hash values to ensure a false positive has not occurred. Another property of hash function is that there is no collision (i.e. no two input values generate same hash value).

Once the associated arc is obtained, the character copy included in the arc may be extracted and assigned to the variable 'arc_ch' (FIG. 9, line 6). The walker process 302 compares the ASCII values of the character copy 'arc_ch' with the current input character 'ch.' If the two ASCII values are not equal, the walker process 302 recognizes the current arc as a false positive. If there is no valid arc for this particular character (i.e., the arc associated with the character has been pruned), the walker process may traverse to the designated node and walk to the node where the designated node points to for this particular character.

In the current example, since the root, or designated, node '0' does include a valid arc for the character 'a,' the walker process will recognize the arc as being valid. Thereafter, the walker process 302 may evaluate flag settings in order to determine if the current node is a mark node (FIG. 9, line 9). The walker process 302 may proceed to assign the node pointer variable 'node_ptr' to the valid arc associated with the character 'a' and may also assign the hash function variable 'hash_fn' to the hash function associated with the next node to which the valid arc points (FIG. 9, lines 10-12). It should be appreciated that the root node may not be compressed, therefore the walker process 302 may index into node '0' in the usual manner explained in relation to FIGS. 5A, 5B(1)-5B(3), and 5C. It should also be appreciated that the hash function associated with the root node may be stored as part of the graph metadata.

The walker process 302 proceeds to evaluate the next input stream 802 character, which is 'b,' and assigns the input variable 'ch' to the corresponding ASCII value (FIG. 9, line 3). Using the hash function included in the valid arc associated with the character 'a,' a hash value ($i_{1b}$) is generated and used to index into the current node '1' (FIG. 9, line 5).

Since the character 'b' is associated with a valid arc in the current node '1,' the hash value $i_{1b}$ will index into node '1' and obtain the valid arc associated with the character 'b' as shown in FIG. 8 (FIG. 9, line 5). Upon obtaining the valid arc, the walker process 302 then utilizes a compare function to verify that the ASCII value of the character 'b' associated with the valid arc is the same as the ASCII value of the input stream character being evaluated 'b' to account for false positives (FIG. 9, lines 6 and 7). The comparison function then returns a positive match since the arc character and input character are equal.

Upon obtaining the positive match and checking the flag status, the walker process 302 proceeds to reassign the next node pointer and hash function variables and evaluates the next input stream byte, which is the character 'c' (FIG. 9, lines 8-11 and 3). The hash function associated with the 'b' arc, $H_2$, then generates a hash value using the character 'c.' The generated hash value ($i_{2c}$) is used to index into node '2' in order to find the valid arc associated with the character 'c' (FIG. 9, line 5). Upon obtaining the valid arc associated with the character 'c,' the walker process 302 again utilizes the comparison function to determine if the current input stream character 'c' is the same as the character associated with the valid arc which was just indexed. Since the two characters are indeed the same, the walker process 302 will receive a positive match notification from the comparison function, and therefore proceeds to generate a hash value with the next input character, 'f' (FIG. 9, lines 6-12 and 3-5).

Upon obtaining a hash value ($i_{3f}$) from the valid arc associated with the character 'c,' the walker process 302 indexes into node '3.' In the example provided by FIG. 8, node '3' comprises two valid arcs, one associated with the character 'd' and the other associated with the character 'e.' In this situation, the hash function ($H_3$) provides an index to either one of the valid arcs of node '3.' Upon using the comparison function, a negative match result is reported. The walker process 302 then proceeds to the designated node (root node '0') and searches for a valid arc associated with the character 'f' (FIG. 9, 6-8 and 1-2). Alternatively, if the designated node (in this case the root node) is not compressed, an associated hash function may be used to find the valid arc associated with the character 'f.' Since such an arc does not exist, the walker process will remain at the designated node, or root node '0,' and evaluate the next input character 'a' (FIG. 9, line 3). It should be appreciated that a single hash function may be utilized for the entire DFA graph, instead of a hash function being associated with each node. The single, or general, hash function may be stored in the graph metadata. It should also be appreciated that the comparison function may be a string character comparison function configured to compare character values rather than ASCII values. It should also be appreciated that any form of comparison may be employed.

The hash walker process described above only makes an access to memory while indexing into a node in order to obtain a valid arc. Therefore, at most, only one memory access is needed for each character in the input stream. Conventional walking processes typically require two or three memory accesses. Thus, the compressed arc and node graph, and the hash walking process may be utilized to reduce the number of memory accesses as well as reduce the amount of memory needed to store the DFA graph.

It should be appreciated that other methods of managing the walker process 302 may be utilized to traverse the compressed node and arc DFA graph. For example, the walker process 302 may be configured to read each arc in a node one by one until a valid arc for the character in question has been found.

Alternatively, in a single memory access, the walker processor 302 may be configured to retrieve a number of arcs (e.g., the walker process may retrieve five arcs in a single memory access) and utilize the comparison function on all of the retrieved arcs. If a positive string match is not obtained, the walker process may make another memory access to retrieve a second grouping of arcs, and so on until a positive match has been found or until all of the arcs in the node have been evaluated.

In another embodiment, each node may comprise a directory, or location table, generated by the compiler such that upon retrieving the location table from memory, the walker process 302 need only find the entry of the character in question in order to find the address of the associated arc. If the associated arc does not exist, the walker process may default to a root or designated node.

Those of ordinary skill in the art should recognize that methods involved in providing the example embodiments described above may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as electromagnetic signals propagating on a computer network, a bus or a communications link, either optical, wired, or wireless, carrying program code segments as digital or analog data signals. The program code enables and supports computer implementation of the operations described in FIGS. 1A-9 or any other described embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method for generating a deterministic finite automata-based graph comprising:
   storing a graph of expressions in memory, the graph including a plurality of nodes, each node having arcs, each arc being for a character and connecting a node to a next node;
   during compilation of the graph:
   identifying at least one node of the plurality of nodes in the graph as a designated node;
   for each node of the plurality of nodes, except the designated node, comparing each arc of a subject node having a plurality of arcs with each arc of the designated node to find an arc of the subject node that is for an identical character and that connects the subject node to an identical next node in the graph as an arc of the designated node, the arc found being called a non-unique arc; and
   removing the non-unique arc from the subject node without reducing the number of nodes in the plurality of nodes.

2. The method of claim 1 further comprising:
assigning the at least one designated node to be associated with at least one sub-section of the graph.

3. The method of claim 1 wherein removing includes:
removing arcs that point to the designated node.

4. The method of claim 1 further comprising:
traversing the graph with a walker process managed by a hash function.

5. The method of claim 1 further comprising:
traversing the graph with a walker process configured to obtain at least two arcs from memory during a single access.

6. The method of claim 1 further comprising:
traversing the graph with a walker process configured to obtain an arc based on a location table.

7. The method of claim 1 wherein an arc of a node comprises a next node pointer to the next node.

8. The method of claim 1 wherein an arc of a node comprises a copy of the character associated with the node.

9. An apparatus comprising:
a memory unit configured to store a graph of expressions including a plurality of nodes, each node having arcs, each arc being for a character and connecting a node to a next node; and
a processor configured to:
during compilation of the graph:
identify at least one node of the plurality of nodes in the graph as a designated node;
for each node of the plurality of nodes, except the designated node, compare each arc of a subject node having a plurality of arcs with each arc of the designated node to find an arc of the subject node that is for an identical character and that connects the subject node to an identical next node in the graph as an arc of the designated node, the arc found being called a non-unique arc; and
remove the non-unique arc from the subject node without reducing the number of nodes in the plurality of nodes.

10. The apparatus of claim 9 wherein the processor is further configured to assign the at least one designated node to be associated with at least one sub-section of the graph.

11. The apparatus of claim 9 wherein the processor is configured to remove arcs that point to the designated node.

12. The apparatus of claim 9 further comprising:
a walking unit configured to traverse the graph, the walking unit managed by a hash function.

13. The apparatus of claim 9 further comprising:
a walking unit configured to traverse the graph by obtaining at least two arcs from memory during a single access.

14. The apparatus of claim 9 further comprising:
a walking unit configured to traverse the graph by obtaining an arc based on a location table.

15. The apparatus of claim 9 wherein an arc of a node comprises a next node pointer to the next node.

16. The apparatus of claim 9 wherein an arc of a node comprises a copy of the character associated with the node.

17. A non-transitory computer usable medium storing instructions for generating a deterministic finite automata-based graph that, when executed by a computer, cause the computer to:
store a graph of expressions in memory, the graph including a plurality of nodes, each node having arcs, each arc being for a character and connecting a node to a next node;
during compilation of the graph:
identify at least one node of the plurality of nodes in the graph as a designated node;
for each node of the plurality of nodes, except the designated node, compare each arc of a subject node having a plurality of arcs with each arc of the designated node to find an arc among the plurality of arcs of the subject node that is for an identical character and that connects the subject node to an identical next node in the graph as an arc of the designated node, the arc found being called a non-unique arc; and
remove the non-unique arc from the subject node without reducing the number of nodes in the plurality of nodes.

* * * * *